United States Patent [19]

Vensel

[11] 4,057,205

[45] Nov. 8, 1977

[54] AIRCRAFT WITH OXYGEN SUPPLY AND METHOD OF SUPPLYING OXYGEN THERETO

[76] Inventor: Richard R. Vensel, 53 Academy Ave., Pittsburgh, Pa. 15228

[21] Appl. No.: 714,113

[22] Filed: Aug. 13, 1976

[51] Int. Cl.² .............................................. B64D 13/06
[52] U.S. Cl. ................................. 244/118 P; 98/1.5; 137/88
[58] Field of Search ............... 244/1 R, 118 R, 118 P; 98/1.5; 62/DIG. 5; 128/142, 204; 137/3, 88, 93, 604; 128/140 R, 142.3

[56] References Cited

U.S. PATENT DOCUMENTS

| | | |
|---|---|---|
| 2,877,966 | 3/1959 | Summers, Jr. ............... 244/118 P X |
| 3,215,057 | 11/1965 | Turek ....................................... 98/1.5 |
| 3,410,191 | 11/1968 | Jackson .................................. 98/1.5 |
| 3,425,333 | 2/1969 | Wachter .................................. 98/1.5 |
| 3,593,735 | 7/1971 | Reiher .................................. 98/1.5 X |

*Primary Examiner*—Stephen G. Kunin
*Assistant Examiner*—Galen L. Barefoot
*Attorney, Agent, or Firm*—Parmelee, Miller, Welsh & Kratz

[57] ABSTRACT

Oxygen is discharged from a source of supply into the cabin of an airplane under the control of an oxygen sensing device to maintain the supply of oxygen in each volume of air at a comfortable level but without increasing the pressure of the atmosphere in the plane above the pressure of the atmosphere at the altitude at which the plane is flying. Expressed in other terms, as the plane ascends to altitudes above a preset level, the partial pressure of oxygen is maintained at a preset comfortable level while the absolute pressure in the cabin decreases with the decrease in pressure of the atmosphere outside the plane and remains at a level above the preset height. This eliminates pressurizing the cabin or the need for breathing masks.

12 Claims, 2 Drawing Figures

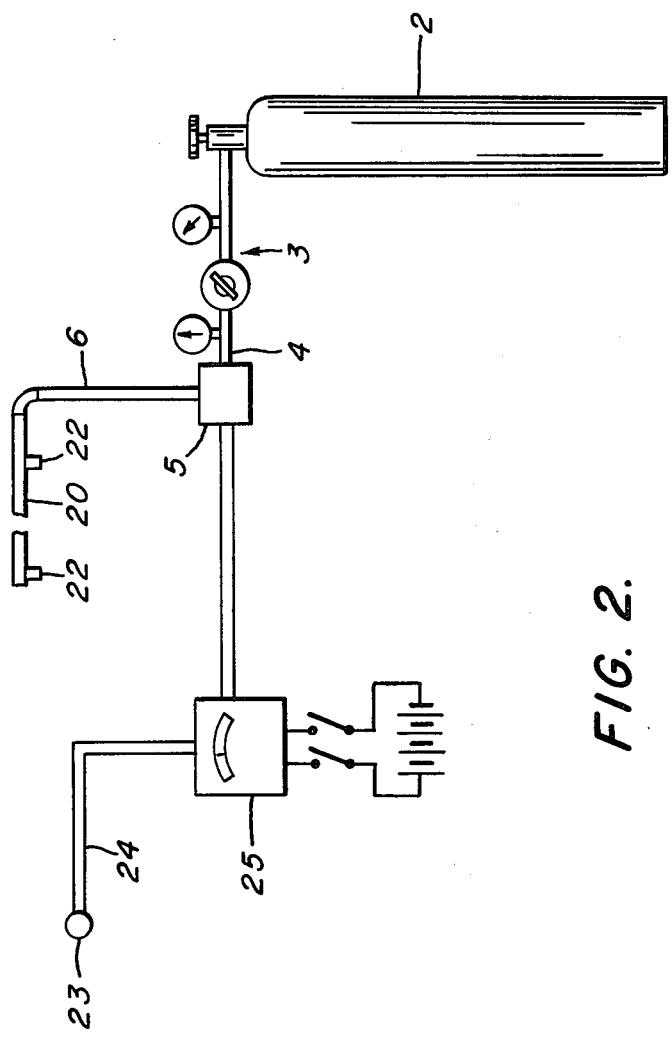
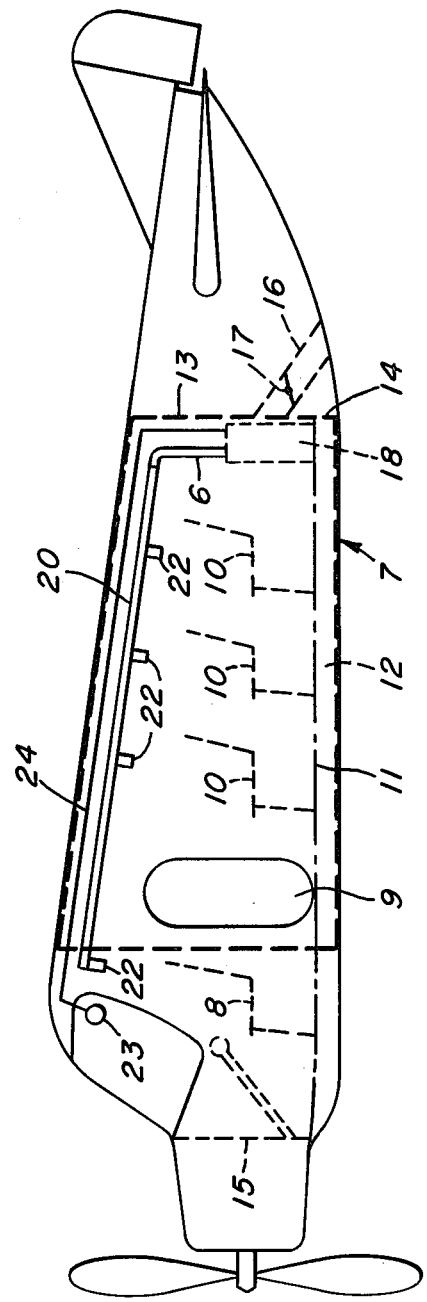
FIG. 1.
FIG. 2.

AIRCRAFT WITH OXYGEN SUPPLY AND METHOD OF SUPPLYING OXYGEN THERETO

This invention relates to aircraft and especially to providing a comfortable supply of oxygen in the unpressurized cabin of the plane notwithstanding the decrease in atmospheric pressure and the resulting decrease in the oxygen content of the outside air as the plane reaches and flies at altitudes above a predetermined level.

By way of explanation, it may be first noted that persons board and travel in commercial jet planes at altitudes of thirty thousand feet or more with no thought of the air through which the plane is flying being so light and devoid of oxygen that they might probably die or suffer severe physical discomfort should they have to long exist in it. The reason such passengers suffer no discomfort is that the cabin of the plane is tightly sealed against the escape of air when the door of the plane is closed at take-off, and, as the plane rises, air is pumped into the cabin to hold the pressure at some preset value, usually at the pressure of the atmosphere at about 8,000 feet above sea level. As the airplane climbs above this height, additional air is pumped into the cabin to maintain this preset pressure and the passengers are unaware of any change of air pressure outside the cabin of the plane, even at altitudes of six miles or more; altitudes where the air is so thin that the propellers of propeller-driven planes would provide inadequate wind speed, or have inadequate "purchase" to sustain flight.

There is only sufficient controlled venting of air from pressurized cabins to replace "stale" air and carbon dioxide and smoke with new pressurized air, so that, even with a full plane, the passengers have no breathing discomfort.

To build the fuselage of a plane strong enough that the internal pressure in the plane does not cause it to explode or burst when the pressure outside the plane is so low adds greatly to the cost of the plane and to its weight, and to seal it tightly against leakage also adds greatly to its cost and unkeep. For commercial jet driven planes there are offsetting advantages, such as speed and low wind resistance at high altitudes with more efficient use of fuel.

Military planes, however, cannot be pressurized in the manner of commercial planes because of the disastrous effect of a hit the plane might suffer from enemy fire and the resulting sudden release of cabin pressure. The cost of pressurized planes makes the ownership of private planes, except for very wealthy persons and corporations, prohibitive, excluding perhaps some exceptional cases where high altitude and high speed are necessary. On the other hand, the number of privately owned planes far exceeds the number of commercial aircraft, and most individuals and corporations now operate mostly with nonpressurized, propeller-driven planes.

Military planes meet the oxygen demands of hight altitude flight by the use of oxygen or air-oxygen mixtures through the multiple oxygen masks which are provided, one for each member of the crew and for each other person in the plane. Thus, oxygen is supplied to each occupant according to his demands, but this procedure has many drawbacks because the masks limit mobility within the cabin and practically prohibit any "social" life, conversation and smoking, and preclude normal eating and drinking. In some cases, personnel may have individual backpacks with oxygen tanks for supplying their masks, and a "plug-in" connection within the cabin enables these individual tanks to be refilled with oxygen and thereby permits persons with this equipment to move about in the cabin.

For the most part, unpressurized private planes, including corporate-owned planes, confine their flights to altitudes below ten thousand feet, and largely to a range between 4,000 feet and 8,000 feet. However, atmospheric conditions may require that they fly much higher to avoid air turbulence over storm areas, or else fly through such turbulence. Either alternative, to say the least, is an exhausting maneuver for the crew and an uncomfortable experience for the passengers. Moreover, because of reduced air resistance, propeller-driven planes can operate, or be supercharged to operate, much more efficiently at a level of 10,000 feet to perhaps 20,000 feet, where there is at the present time only very sparse air traffic. This is because the "thin" air in this altitude range makes one not provided with a breathing mask uncomfortable and exhausted, and may even be physically harmful (hypoxemia). A discussion of hypoxemia and its dangers appears in *Aerospace Magazine*, August, 1970.

It is common knowledge that atmospheric air comprises about one-fifth oxygen by volume to about four-fifths nitrogen, and this ratio is substantially constant to levels as high as 100,000 feet above sea level. The exact proportion is 20.95% oxygen ($O_2$) by volume to nitrogen, $N_2$ (including also small percentages of other atmospheric gases). The total pressure of the atmosphere is commonly referred to as the "barometric pressure," and various types of barometers are, of course, well known for measuring this pressure, the fluctuations of which foretell approaching weather conditions. These instruments at first comprised tubes filled with mercury, closed at the top and with the open bottom perhaps immersed in a cup of liquid mercury, and barometric pressure is therefore usually calibrated in the terms of rise or fall of liquid in this column. At sea level the atmosphere will support a column of the order of 760 mm (also expressed as 29.92 inches of mercury or it equals 14.7 pounds pressure), changing slightly as weather conditions fluctuate.

In a mixture of gases, such as air, the weight or pressure exerted by each gas relative to the other or others is expressed as the "partial" pressure. With a barometric pressure of 760 mm and a temperature of 0° C. (32° F.), the partial pressure of the nitrogen in the air at sea level is about 600 mm and the partial pressure of the oxygen is 159 mm.

Most of the earth's population live at altitudes between 8,000 feet and sea level. At an elevation of 8,000 feet the barometric or total pressure falls from 760 mm at sea level to 565 mm. At this elevation, the partial pressure of the oxygen is 118.3 mm. This is equal to 0.20 grams of oxygen per liter of air. Normal people live comfortably with oxygen at this density.

Stated somewhat differently, a normal inactive person who inhales one liter of air with each breath will supply to his lungs 0.20 gr. of $O_2$ and will be completely comfortable. However, as the plane climbs above 8,000 feet, there is a proportional decrease in the partial pressure of both the oxygen and the nitrogen. The decrease in nitrogen is relatively unimportant, but the decrease in oxygen becomes increasingly unpleasant and then serious. Fortunately, since nitrogen (and this term includes trace gases in the air) comprises about four-fifths of the air and oxygen about one-fifth, only one volume of oxygen is lost with each four volumes of nitrogen. Therefore, only a relatively small amount of oxygen need be supplied to the atmosphere at higher elevations to keep the partial pressure of oxygen in the nonpressurized cabin of an airplane at the level which prevails in the air at 8,000 feet, except for leakage, which is greater from the cabins of some aircraft than in others.

THE PRESENT INVENTION

The present invention, therefore, is based on maintaining the partial pressure of the oxygen at a set value after the plane reaches a given altitude. For example, 118.3 mm of oxygen prevails at 8,000 feet. Each liter of volume in the unpressurized cabin contains 0.209 grams of oxygen at 8,000 feet, and, with this invention, $O_2$ will be supplied in an amount to maintain its density although the total pressure inside the cabin equals the ambient pressure outside of the plane. Therefore, a person in the cabin will inhale with each liter of atmosphere in the cabin 0.209 grams of $O_2$. In other words, the partial pressure of oxygen in the cabin is the same at 15,000 feet, for example, as it is at 8,000 feet. Since the oxygen in the cabin contains only the partial pressure at 15,000 than at 8,000 feet, it will oxidize combustible substances no more vigorously or rapidly; oxygen masks are not necessary and there is no increased fire hazard, nor is there danger of being overcome by excess oxygen. In other words, the number of molecules of oxygen per liter remains the same at any altitude normally flown by a propeller-driven plane or a jet at 15,000 or 20,000 feet as in air at 8,000 feet elevation. I have chosen the setting above which $O_2$ is to be supplied to be the partial pressure at 8,000 feet, but it could be any altitude between 4,000 feet and 8,000 feet, inclusive, or even a little more and even sea level, except some altitude significantly above sea level is desirable to prolong the oxygen supply.

This process is made possible by the use of an oxygen measuring apparatus for constantly monitoring the $O_2$ content of the cabin air, turning on the oxygen supply to the cabin or shutting it off as required. It responds, not as an altimeter to a drop in external air pressure, but to the molecules of oxygen in the air to which it is exposed. An altimeter which is now used on planes equipped with masks could not be used as the monitoring means because it turns on air and oxygen mixture, or oxygen alone, as soon as the plane reaches a preset level and keeps it on until the plane again descends to this lower preset level where the masks are no longer needed. The total pressure and not the partial pressure of oxygen is controlling where an altimeter is used.

It is to be recognized that among the popular nonpressurized private and corporate planes some are much tighter than others, design and age of the plane resulting in wide variation in the cabin tightness. The fuselage of a plane is generally of a torpedo-like shape, tapering toward the rear, and when the airplane is in flight there is a lower total pressure around this tapered length than forward of it. To avoid excessive loss of oxygen by leakage and aspiration of cabin atmosphere at the trailing end of the plane, it may be desirable, if not necessary, in many existing planes to apply some seal coat of plastic around the interior of the plane and provide an interior sealed wall across the cabin at the rear. This will reduce loss of cabin atmosphere through rivet holes, small openings of various kinds, and more effective weather seals may be applied to the door, not for pressurizing the cabin, but, as above explained, to avoid waste of oxygen, by the aspiration of cabin atmosphere by reason of the movement of the plane through the air. There is adequate leakage in the forward end of the plane, around the controls and other areas to enable the absolute pressure in the cabin to equalize with the atmosphere outside the cabin, but there is less loss of cabin atmosphere at the forward end of the fuselage because of the movement of the plane through the air.

The invention may be more fully understood by reference to the accompanying schematic drawings of a preferred embodiment of my invention, wherein:

FIG. 1 represents schematically apparatus for use in an airplane for the practice of this invention; and FIG. 2 is a more or less diagrammatic side elevation of an existing type of airplane fuselage prepared for use with this invention.

Referring to FIG. 1, 2 designates a source of $O_2$, such as a cylinder of $O_2$, under pressure. It has a usual regulator valve and regulator cluster 3, including gauges at its discharge end through which oxygen flows through connection 4 to an electrically operated control valve 5.

FIG. 2 is a conventionalized illustration of an airplane fuselage 7 with the wings removed to provide a kind of "X-ray" illustration. It is intended to illustrate a typical eight occupant plane with two seats 8, only one of which is shown in the drawing because they are side by side. There are six other seats 10, three of which are at each side of a center aisle so that only three are seen in the drawing. The seats are supported on a floor 11 spaced above the bottom of the fuselage. A longitudinal space 12 is provided below the floor within the shell through which control cables and wiring extend and in which other paraphernalia may be secured.

According to this invention, existing planes may be prepared for practicing this invention by placing a light, airtight barrier 13 across the cabin behind the last two seats 10, and barrier 14 is also placed across the under-floor space or duct 12 through which any cables or wire, not shown, pass, grommets or like guides (not shown) being provided where the cables and wire pass to the tail of the plane. If the fuselage has openings such as might be present from rivets that are loose or ill-fitted or in poor repair, the cabin may be sealed with an exterior plastic spray or a thin plastic film coated over the interior beginning at or near the beginning of the backward taper of the fuselage and extending back to the transverse rear wall 13. This part of the plane is indicated by the heavy dash lines along the contour lines of the fuselage and by the transverse row of dash lines somewhere near or to the rear of the seats for the pilot and copilot. The cabin enclosure so formed then resembles, as here shown, a large tapered drinking tumbler positioned sideways with the opened end facing the front of the fuselage. If there is a partition at the rear of the cockpit where the crew seats 8 are located, a vent may be provided in this partition so that the pressures throughout the interior of the plane will be equalized. Since there will be leakage around the control stick, etc., and around the fire wall 15, there will be adequate provision for equalization of pressure inside the plane with the atmosphere around the plane.

In the partition 13 near the floor there is indicated a damper controlled vent that may be opened from time to time to vent carbon dioxide and stale air from the cabin to the atmosphere. This vent is designated 16 and the damper is 17. With only the crew in the plane, this vent will need opening less frequently, of course, than when there is a full or partial complement of passengers. Of course, some oxygen will be lost with any opening of the vent.

Returning to FIG. 2, the oxygen system therein disclosed may be received in a cabinet 18, here shown in FIG. 2, to be readily accessible at the front of the partition 13 and, of course, to one side of the vent 16. The oxygen pipe 6 in FIG. 1 connects to a longitudinally extending manifold 20 along the ceiling of the cabin to the front of the plane. It has outlets indicated at 22 above the crew seating area and along its length discharging into the open cabin preferably in the vicinity of, but not close to, the seats 10 so that it will diffuse through the cabin air and not discharge in close proximity to the crew and passengers.

Planes built hereafter can be built with the cabin sealed against excess loss of oxygen but with adequate openings to the exterior of the plane for the outflow or influx of air as the plane ascends or descends so that the cabin pressure and external pressure will equalize but with the partial pressure of $O_2$ maintained at the predetermined setting.

There is indicated an oxygen sensor at 23, usually positioned at some position in the cabin above the floor and preferably in the cockpit area. These sensors are well known instruments, and ones which are quite suitable for the purpose, that respond to the presence of oxygen and are unresponsive to other atmospheric gases because oxygen alone possesses paramagnetic properties to a measurable degree. The denser the oxygen, the higher a pointer reads on a calibrated scale. According to this invention, the sensor 23 is connected through wires 24 to a transducer and amplifier means 25 to the control valve 5. If the oxygen sensor 23 is set to deliver oxygen when the partial pressure of $O_2$ in the cabin falls below the selected setting, here assumed for purposes of illustration to be a partial pressure of 118.3 mm of mercury, oxygen will be supplied to the cabin and the supply will continue as long as the plane continues to ascend. When the plane levels off, say at 15,000 feet, oxygen will then be required only to replace that consumed by the crew and passengers and that lost by some leakage or deliberate replacement by venting stale air and $CO_2$ from time to time.

In the foregoing description, a pressure cylinder of oxygen is illustrated as a source of oxygen, but oxygen inflated bags, wherein the gas pressure relative to cabin pressure increases as cabin pressure decreases and which could be placed in the wings, the tail section or under the floor, or liquid oxygen containers with converters, also of well-known design, or some chemical source may be substituted, depending upon the use to which the plane is to be put, the expected length of time between available renewal of the $O_2$ supply and reasonable load carrying capacity of the plane.

Oxygen sensing devices as above referred to are reliable, but other types of sensing devices could be substituted. For purposes of illustration, however, it may be explained that since a candle will burn, for all practical purposes, with the same brightness as long as the partial pressure of oxygen remains at a selected value, a decrease in the partial pressure of oxygen will diminish the brightness of the flame and an increase in partial pressure will intensify the rate of combustion, a photometer or like light responsive means may be used to regulate at least more or less accurately the supply of oxygen, either by manual control or automated means.

As the aircraft provided with the system here disclosed descends from a higher altitude to a lower one, the $O_2$ sensing and monitoring means will respond to the natural increase in the oxygen due to the influx into the cabin of outside air as the pressure outside and inside the cabin equalize. First, this will eliminate the need for oxygen from the cylinder or other supply source, and so cut off the delivery of oxygen from the supply source to the cabin and may result in a very temporary increase in the partial pressure of oxygen in the cabin. This is desirable, especially in landing at night when an increase in oxygen increases the alertness of the pilot and usually eliminates any sense of drowsiness for a while.

Since the oxygen in the cabin is constantly monitored to maintain a predetermined partial pressure of oxygen, the oxygen will be supplied to meet the demands of the passengers, including the crew. When only one or two persons are aboard, they will consume much less oxygen than when there is also a full complement of passengers. Consequently, overexposure of the pilot, or pilot and copilot, to excessive oxygen, where he or they are the only occupants of the plane, is eliminated and breathing masks are unnecessary. Present systems wherein the flow of oxygen is controlled only by opening the supply of oxygen when the plane reaches a selected altitude and keeps the supply open could not be used without breathing masks without dangerously enriching the oxygen in the cabin.

In general, therefore, the invention contemplates the continuous monitoring of the oxygen content in the cabin atmosphere of an unpressurized plane to supply to the cabin from a source of supply the amount of oxygen required to maintain a predetermined partial pressure of oxygen in the cabin when the aircraft is flying above a predetermined altitude but which shuts off the supply when such partial pressure is reached and supplies more as it may be needed. By unpressurized cabin, I may include a pressurized cabin which, because of some failure, may temporarily lose its pressure while it is in flight, thereby eliminating the fear or panic that passengers undergo when suddenly confronted with a need to wear breathing masks.

I claim:

1. The combination, with an airplane having an unpressurized cabin such that the pressure within the cabin corresponds to the pressure of the atmosphere surrounding the plane at any altitude at which the airplane is flying, of means in the cabin of the plane for monitoring the oxygen content of the atmosphere within the cabin, a source of oxygen supply aboard the airplane, and means responsive only to said monitoring means for releasing oxygen from the supply source into the cabin when the oxygen content for any cause falls below a predetermined partial pressure and terminating the release of oxygen from said source when said partial pressure of oxygen is restored.

2. The combination as defined in claim 2 wherein the cabin has a fuselage which tapers rearwardly from a place of maximum diameter and the rear portion is at least partially sealed against loss of cabin atmosphere through such rearwardly tapering portion when the plane is moving through the air, the forward portion of the cabin being closed, but not sealed, so that atmospheric pressure inside the cabin may equalize with that outside the cabin.

3. The combination defined in claim 2 wherein there is a valve controlled vent through which stale air and carbon dioxide generated by cabin occupants may be controllably discharged from the cabin.

4. The combination defined in claim 1 in which there is a manifold with multiple spaced outlets through which oxygen is discharged into the cabin.

5. The combination defined in claim 1 wherein the oxygen monitoring means comprises an oxygen sensing device responsive only to an increase or decrease in the density of the oxygen in the cabin and a control means responsive thereto for releasing oxygen into the cabin, reducing the oxygen flow into the cabin and closing down the discharge of oxygen into the cabin from said source of supply.

6. The combination defined in claim 1 wherein the oxygen monitoring means and the control means are adjustable to release oxygen only when the partial pressure of oxygen in the cabin atmosphere falls below a preselected measurement higher than its partial pressure at sea level and below a predetermined level where a cabin supply of added oxygen is unnecessary.

7. In an aircraft having a draft-free unpressurized cabin when in flight at any altitude at which the plane is flying whereby the cabin pressure is at all times equal to the ambient pressure with means for supplying the oxygen requirements of the occupants of the cabin during flight, comprising:
 a. an oxygen supply source;
 b. means arranged to conduct oxygen from the supply source and discharge it directly into the cabin atmosphere;
 c. means for constantly monitoring the oxygen content of the cabin atmosphere at all times during flight; and
 d. means controlled by said monitoring means for maintaining a selected partial pressure of oxygen in the cabin at all elevations through which the aircraft navigates above a preselected altitude without regard to the increase or decrease in the total pressure of the atmosphere inside or outside the cabin.

8. The combination with an aircraft having a cabin, the forward end of which is open to ingress and egress of ambient air but which is closed at the sides and rear against the uncontrolled flow of air either in or out during flight, therefore the cabin pressure and ambient pressure are at all times practically equal, comprising
 a. a source of oxygen supply in the aircraft;
 b. means for delivering oxygen from said supply source directly into the cabin atmosphere;
 c. means for monitoring the oxygen content of the cabin atmosphere at all times; and
 d. means for regulating the release of oxygen from said source into the cabin to maintain the partial pressure of oxygen in the cabin atmosphere constant at all elevations at which the aircraft flies above a preselected elevation.

9. The method of supplying oxygen to the unpressurized cabin of an airplane in flight, where the cabin pressure and ambient pressure are at all times practically equal, to provide adequate oxygen for the occupants of the cabin at all altitudes to which the plane flies which comprises monitoring the partial pressure of the oxygen in the cabin and releasing oxygen from a supply source aboard the airplane directly into the cabin to maintain a preselected partial pressure of oxygen in the cabin atmosphere above a preselected minimum at all altitudes where the oxygen in the ambient air is below said preselected partial pressure.

10. The method defined in claim 9 wherein the partial pressure of oxygen to be maintained in the cabin during flight is preselected to the partial pressure prevailing at a predetermined level above sea level but below a selected level of flight of the airplane.

11. The method defined in claim 7 wherein the monitoring device determines the density of the oxygen in the cabin atmosphere, and regulating the release of oxygen from the supply source into the cabin at such times and in such manner as to maintain the preselected minimum of partial pressure of oxygen and compensate for a decrease below said minimum partial pressure of the oxygen due either to a change of elevation or the conversion of oxygen to carbon dioxide by the breathing of the occupants of the airplane.

12. The method wherein an existing airplane which has heretofore been constructed and which has an unpressurized cabin for use at elevations where an oxygen supply from a source aboard the plane is mandatory or required, which comprises:
 a. sealing the cabin of the plane at the rear of the cabin and forwardly around the fuselage of the plane, at least as far as loss of cabin air is likely to occur by the suction created outside the plane when it is in flight, to provide a cabin enclosure normally open in flight only in the direction of flight of the airplane, therefore the cabin pressure and ambient pressure are at all times practically equal; and
 b. providing an oxygen sensor in the enclosure to monitor the oxygen content of the air in the enclosure, placing a source of oxygen gas aboard the airplane with means for delivering oxygen gas from said source into the enclosure, and utilizing the oxygen sensor to maintain a preselected partial pressure of oxygen in the enclosure to some preselected partial pressure when the airplane is at or above a predetermined altitude.

* * * * *